United States Patent [19]

Mattson, Jr. et al.

[11] Patent Number: 6,164,841
[45] Date of Patent: Dec. 26, 2000

[54] METHOD, APPARATUS, AND PRODUCT FOR DYNAMIC SOFTWARE CODE TRANSLATION SYSTEM

[75] Inventors: James S. Mattson, Jr., Campbell; Lacky V. Shah, Sunnyvale; William B. Buzbee, Half Moon Bay; Manuel E. Benitez, Cupertino, all of Calif.

[73] Assignee: Hewlett-Packard Company, Palo Alto, Calif.

[21] Appl. No.: 09/073,210

[22] Filed: May 4, 1998

[51] Int. Cl.[7] ............................................. G06N 9/45
[52] U.S. Cl. ........................................... 395/500.02
[58] Field of Search ................................ 395/705, 704, 395/709; 717/5, 4, 9

[56] References Cited

U.S. PATENT DOCUMENTS

| | | |
|---|---|---|
| 4,071,744 | 1/1978 | Pollock . |
| 5,133,072 | 7/1992 | Buzbee ........................................ 717/9 |
| 5,193,180 | 3/1993 | Hastings . |
| 5,212,794 | 5/1993 | Pettis et al. ............................. 395/709 |
| 5,335,344 | 8/1994 | Hastings . |
| 5,355,491 | 10/1994 | Lawlor et al. . |
| 5,367,685 | 11/1994 | Gosling . |
| 5,369,766 | 11/1994 | Nakano et al. . |
| 5,381,534 | 1/1995 | Shi . |
| 5,414,855 | 5/1995 | West . |
| 5,442,790 | 8/1995 | Nosenchuck . |
| 5,450,586 | 9/1995 | Kuzara et al. .......................... 395/704 |
| 5,452,457 | 9/1995 | Alpert et al. . |
| 5,487,158 | 1/1996 | Amelina et al. . |
| 5,504,914 | 4/1996 | Lai . |
| 5,519,866 | 5/1996 | Lawrence et al. . |
| 5,522,036 | 5/1996 | Shapiro . |
| 5,522,072 | 5/1996 | De Bruler . |
| 5,535,329 | 7/1996 | Hastings . |
| 5,548,794 | 8/1996 | Yishay et al. . |
| 5,581,697 | 12/1996 | Gramlich et al. . |
| 5,583,988 | 12/1996 | Crank et al. . |
| 5,590,331 | 12/1996 | Lewis et al. . |
| 5,606,697 | 2/1997 | Ono . |
| 5,625,832 | 4/1997 | Ohsawa et al. . |
| 5,627,981 | 5/1997 | Adler et al. . |

(List continued on next page.)

OTHER PUBLICATIONS

Bob Cmelik & David Keppel, "Shade: A Fast Instruction–Set Simulator For Execution Profiling", Sigmetrics 94, May 1994, Santa Clara, Ca USA 1994, pp. 128–137.

"Daisy: Dynamically Architected Instruction Set From Yorktown", IBM Corporation, 1996, 2 pages.

(List continued on next page.)

*Primary Examiner*—Tariq R. Hafiz
*Assistant Examiner*—Chameli Chaudhurt Das

[57] ABSTRACT

A method and apparatus for improving the process of software development by a dynamic software development tool. The present invention efficiently executes in a user process and provides software developers with a high performance tool for software optimization. The present invention may augment the user process code instructions at runtime and, for every series of machine instructions that the original user source code would have executed, a series of instructions may be executed that are semantically equivalent to the user process code instructions and are altered to optimize the user process code instructions. The present invention may use emulation or translation to alter the user process code instructions. The resulting process is executed in the user process space and advantageously maintains the original flow of instruction execution. The present invention employs a technique of dynamically translating code at runtime and may operate on a virtual machine or a hardware machine. Further, the present invention may operate on various types of code segments and is not, for instance, limited to manipulating only code modules and may operate on a basic code block. Therefore, the present invention enables efficient optimized user process code instruction debugging, instrumentation, and simulation by preserving the original flow of user process code instructions while enabling emulation and translation on the original user process code instructions.

25 Claims, 5 Drawing Sheets

U.S. PATENT DOCUMENTS

| | | | |
|---|---|---|---|
| 5,628,016 | 5/1997 | Kukol . | |
| 5,644,742 | 7/1997 | Shen et al. | 712/244 |
| 5,652,884 | 7/1997 | Palevich . | |
| 5,655,121 | 8/1997 | Delagi et al. . | |
| 5,713,010 | 1/1998 | Buzbee et al. | 345/507 |
| 5,732,210 | 3/1998 | Buzbee | 714/38 |
| 5,751,985 | 5/1998 | Shen et al. | 712/218 |
| 5,764,962 | 6/1998 | Buzbee | 395/500.44 |
| 5,778,245 | 7/1998 | Papworth et al. | 712/23 |
| 5,815,720 | 9/1998 | Buzbee | 717/9 |
| 5,838,978 | 11/1998 | Buzbee | 717/5 |
| 5,854,928 | 12/1998 | Buzbee | 717/5 |
| 5,857,103 | 1/1999 | Grove | 395/705 |
| 5,909,578 | 6/1999 | Buzbee | 717/4 |
| 5,911,073 | 6/1999 | Mattson Jr. et al. | 717/1 |
| 5,933,622 | 8/1999 | Buzbee | 395/500 |
| 6,052,530 | 4/2000 | Buzbee et al. | 717/9 |

OTHER PUBLICATIONS

"Digital FX!32", Digital Semiconductor, 3 pages.

Matt Pietrek, "Learn System—Level Win32 Coding Techniques By Writing An API Spy Program", Systems Journal, Dec. 94', pp. 17–44.

R. Sites, et al., "Binary Translation", Communications Of The ACM, Feb. 93', vol. 36, No. 2, pp. 69–81.

Eric Traut, "Core–Building The Virtual PC", Byte, Nov. 97', pp. 51–52.

Harry J. Saal & Zui Weiss, "A Software High Performance APL Interpreter", IEIE–IEIE, vol. 9, Issue 4, 1979, pp. 74–81.

Ronald L. Johnston, "The Dynamic Incremental Compiler Of APL/3000", IEIE–IEIE, vol. 9, Issue 4, 1979, pp. 82–87.

Kemal Ebcioglu & Erik R. Altman, "DAISY: Dynamic Compilation For 100% Architectural Compatibility", IBM Research Report, RC 20538, Aug. 5, 1996, Computer Science, pp. 1–82.

Reed Hastings & Bob Joyce (Pure Software, Inc.), "Purify: Fast Detection Of Memory Leaks And Access Errors", USENIX—Winter 92', pp. 125–136.

Title: Techniques for Efficient Inline Tracing on a Shared–Memory Multiprocessor, author: Eggers et al, ACM, 1990.

Title: TRAPEDS: Producing Traces for Multicomputers via Execution Driven Simulation, author: Stunkel et al, ACM, 1989.

Title: A Review of Automated Debugging System: Knowledge, Strategies and Techniques, author: Ducase et al., IEEE, 1988.

Title: Optimally Profiling and Tracing Programs, author: Ball et al, 1992 ACM.

Title: Efficient Program Tracing, author: Larus, May 1993, Computer.

METHOD, APPARATUS, AND PRODUCT FOR DYNAMIC SOFTWARE CODE TRANSLATION SYSTEM

FIELD OF THE INVENTION

The present invention relates to optimization tools and more particularly, but not by way of limitation, to optimization, software simulation, dynamic instrumentation, profiling, and monitoring tools that aid in the performance analysis, development, and maintenance of computer software.

RELATED APPLICATIONS

The following applications are related to the present application.

U.S. patent application entitled "SYSTEM AND METHOD FOR JUMP-EVALUATED TRACE DESIGNATION," attorney docket number 10971492-1, naming as inventors James S. Mattson, Jr., Lacky V. Shah, and William B. Buzbee, assigned to the assignee of the present invention and filed concurrently herewith, the detailed description and figures of which are incorporated by reference in their entirety as specified in the specification of the present invention.

U.S. patent application entitled "SYSTEM, METHOD, AND PRODUCT FOR CONTROL-PATH-EVALUATED TRACE DESIGNATION," attorney docket number 10971147-1, naming as inventors Manuel E. Benitez, James Mattson, Jr., William B. Buzbee, and Lacky V. Shah, assigned to the assignee of the present invention and filed concurrently herewith, the detailed description and figures of which are incorporated by reference in their entirety as specified in the specification of the present invention.

BACKGROUND OF THE INVENTION

Developing and maintaining computer system software has long been recognized as a difficult and error prone technology. Problems such as optimizing, simulating, analyzing, and debugging executing software have continued to exist. The need for improvements in optimization which contain features to aid in solving programming problems is prevalent.

Many computer programs employ techniques that include repetitive processing. For instance, software loop and recursion constructs are often used to instruct a computer to execute repetitively. Unnecessary code jumps between instructions in computer memory and instructions located on slower storage media are also inefficient. During compilation these and other software constructs and techniques, known and appreciated by those skilled in the art, may generate inefficient code instructions. Software optimization tools seek to employ techniques to exploit opportunities to improve the efficiency of generated code instructions.

Software optimization tools are used in computer software, architecture, and hardware design. For instance, software debugging, monitoring, and profiling tools provide useful information about the execution of a software program which is used by software simulation tools. Software simulation tools also provide information which is in turn, used by software analyzer tools to predict future behavior of a software program.

Software simulation, as used herein, is a type of optimization and is the process of updating the state of an original software program in a user process which has been maintained in software, often called the virtual state. The user process is compiled and executes within a software system environment. The software system environment information which is available at compile-time, before the loader is invoked, is different than the information available after the loader is invoked, at run-time. Simulation may occur while the software program is executing, at run-time, thereby adding execution overhead that inhibits the improvement of execution performance.

Further, software simulation tools may include a class of tools that translate original code instructions into different instructions. The simulation tools translate both software instruction execution data and computer environment data, such as the machine state of registers, condition codes, and hardware-specific parameters. The translation creates software program state values which are formatted to execute on a pre-determined computer environment which may be different than the original computer environment. Monitoring or profiling by contrast simply records the state of the original program by a logging mechanism. While simulation, monitoring, and profiling provide useful information to aid in software development, they add overhead to the execution of software and thereby also inhibit the improvement of execution performance.

Software optimization is necessary to improve the efficiency of computer resource usage even with the introduction of these tools. For instance, prior art simulation tools degrade execution performance of the software. At each code instruction the simulation tool can check the state of the software environment and save the current computer system state values and environment data. However, the complex nature of the software simulation tool and its ability to analyze executing code at run-time adds a significant amount of processing and logging overhead. Optimization for run-time environments is critical to improving simulation tool overhead and other forms of inefficient computer resource allocation.

Therefore, from the foregoing it will be apparent that poor performance and cumbersome methods of operation with past monitoring and debugging, simulation, and analysis tools have limited the further improvement of software maintenance and development techniques.

SUMMARY OF THE INVENTION

The present invention is a dynamic software development tool that efficiently executes in an executing user process and provides software developers and users with a high performance tool for software optimization. The present invention may augment the user process code instructions at run-time and, for every series of machine instructions that the original user source code would have executed, a series of instructions may be executed that are semantically equivalent to the user process code instructions and are altered to optimize the user process code instructions. The present invention may use emulation or translation to alter the user process code instructions. The present invention novelly processes user code instructions to determine whether emulation or translation is most efficient. Preferably, the translated code is capable of executing on the same instruction set architecture as the original code. The resulting process is executed in the user process space and advantageously maintains the original flow of instruction execution. Therefore, the present invention enables efficient optimized user process code instruction debugging, instrumentation, and simulation by preserving the original flow of user process code instructions while enabling emulation and translation on the original user process code instructions.

The present invention employs a technique of dynamically translating code at runtime and may operate on a virtual machine or a hardware machine. Dynamic translation, which is sometimes called dynamic instrumentation, uses a virtual machine that transforms the state of the original machine to the state of the destination machine. Further, the present invention may operate on various types of code segments. It is not, for instance, limited to manipulating only code modules and may operate on a basic code block.

In one embodiment, the present invention is a dynamic software development tool that includes an original instruction processor (not to be confused with a central processing unit or CPU), a development tool manager, a trace designator, a trace translator, and a backpatch manager. The original instruction processor operates in cooperation with the operating system and CPU, and assumes control over the execution of original instructions of an executable file. Such instructions, and associated data if any, are hereafter collectively referred to simply as "original instructions." It will be understood by those skilled in the relevant art that such original instructions may be an image, or copy, of the instructions of the executable file stored on a program storage device, described below. The original instruction processor also selectively directs control among various functional modules of the trace designator. The original instruction processor includes an execution interrupter, a machine state loader and preserver, a trace selector, and an instruction emulator.

The execution interrupter of the original instruction processor, in cooperation with the CPU and the operating system, suspends conventional execution of the original instructions by the CPU under the direction of the operating system and, instead, initiates control by the original instruction processor over instruction execution. The execution interrupter also returns control over instruction execution to the CPU under the direction of the operating system after the dynamic software development tool completes or terminates its operations.

The machine state loader and preserver of the original instruction processor preserves the state of various machine values or conditions, such as the values of registers, status flags, or system memory locations, prior to the altering of any such values or conditions by the dynamic software development tool. The machine state loader and preserver also reinstates such values or conditions after the dynamic software development tool completes or terminates its operations using altered machine states. Thus, the user process code instructions are returned to their state prior to the operation of the dynamic software development tool.

The trace selector of the original instruction processor selectively directs control among the instruction emulator, the trace translator, and translated and optimized instructions in a translated instruction storage area of memory. It will be understood that those skilled in the art may refer to the trace selector as a switch mechanism. Generally, the trace selector directs control to the instruction emulator to simulate execution of the original instructions until an original instruction is encountered that has already been translated, or an original jump instruction is encountered. If a previously translated original instruction is encountered, the trace selector directs control to the corresponding translated instruction for execution. In one implementation, if a jump instruction is encountered, the trace selector may transfer control to the backpatch manager.

The dynamic software development tool may include an instruction emulator that emulates original user process code instructions that have not been translated and the emulated instructions are substituted for the user's instructions. The instruction emulator uses the user process code instructions as data that are executed by the emulated instructions. The emulation process performs the equivalent operations that the user would have performed and also includes the desired instrumentation operations. That is, rather than original instructions being executed by the CPU, emulated instructions are executed by the CPU under the control of the instruction emulator. Thus, control may be passed by the instruction emulator to the trace selector so that the trace selector may selectively direct control as noted while preserving the original flow of the user process code instructions.

The dynamic software development tool according to the present invention may execute with other augmenting software tools that enable software development including software debugging, monitoring, and profiling tools, software simulation tools, and software analysis tools. Software debugging, monitoring, and profiling tools use the dynamic software development tool to maintain the state of the original user process code. Software simulation tools require the dynamic software development tool to update in memory the state of the original user process during the execution of the translated code. Software analyzer tools access run-time machine state information from the dynamic software development tool and, for instance, may thereby predict future behavior of software code.

In one embodiment of the present invention a user may indicate whether a debugging, a monitoring, a profiling, a software simulation, or an analyzer tool shall be enabled and executed with the dynamic software development tool. The enabling information is stored by cooperation with the operating system environment in a tool kit enable list. A development tool manager that operates on the emulated or translated instructions from the original instruction processor obtains information from the tool kit enable list. The information from the tool kit enable list will trigger the development tool manager to access and log appropriate information in computer data structures.

In one embodiment of the present invention, a trace designator designates groups of instructions, referred to as traces, for dynamic translation based on an evaluation of control flow. The trace designator detects and optimizes at least one hot trace, if present, in the executable file. A hot trace is a trace through which control frequently passes, or has passed more than a predetermined number of times, as described in greater detail below. That is, a trace is typically identified as a hot trace based on the actual course of execution over a trial period rather than on an estimate made at compile time, or a projection based only on initial execution, of how the file will execute.

In one embodiment, the trace designator includes a hot block translator and instrumenter to translate the original instructions of the executable file into translated instructions. Advantageously, the translated and instrumented instructions created by the block translator and instrumenter provide monitoring of the dynamic behavior of the execution of the executable file with much less loss of speed than typically would occur by alternative techniques. For example, if the original instructions of the executable file had been emulated in order to monitor such dynamic behavior, the loss of speed would typically be many times greater than the loss of speed that typically occurs by executing translated instructions due to managing the overhead associated with the machine state loader and preserver. Also advantageously, such monitoring during execution of the translated instructions typically avoids some of the costs in time and memory usage generally incurred when instructions are optimized. More specifically, by deferring optimization of instructions until it is determined that a trace is executed frequently, the likelihood is increased that the increase in speed achieved by optimization, the effects of which are multiplied by frequent usage, will offset such costs of optimization.

In one embodiment, a hot trace selector receives a hot block identifier and designates a hot trace. In such illustrative embodiment, the blocks through which such a frequently traveled control path flows are designated by the hot trace selector as a hot trace. Advantageously, the dynamic behavior of the flow of control is based on actual operating conditions and usage rather than estimates based on the structure of the executable file such as, for example, the presence of loops, branches, switches, or other structural indicators. Also advantageously, alternative statistical methods may be employed in alternative embodiments to alter the manner in which hot traces are designated. For example, dynamic behavior resulting in a sum of hot block counters above a threshold value may be used to designate a hot trace in one embodiment, whereas the computation of a statistical mean of counter values that is above a threshold value may be so used in another embodiment.

In one embodiment, the trace designator communicates with an optimizer to receive and dynamically optimize hot traces. Advantageously, certain known optimization techniques may be applied at run time by a dynamic optimizer that generally could not be applied at compile time by a static optimizer. A reason for such increased capability is that the precise control flow path is known at run time with respect to the hot trace to be optimized. Thus, variables that could have a range of values depending on control flow generally have only one possible value as a result of a known control flow. Original instructions of the executable file compiled so as to accommodate such variability may therefore be optimized by the dynamic optimizer. That is, the dynamically optimized instructions may be simplified, reduced in number, or otherwise optimized because certain possibilities associated with alternative control paths not taken may be excluded.

In further explanation of the present invention, the trace designator also includes a hot trace detection instrumenter that selectively provides hot blocks to the block translator and instrumenter. Advantageously, the hot trace detection instrumenter detects original instructions that are frequently executed. In such and other aspects of the present invention, the hot trace detection instrumenter excludes from translation and optimization those original instructions of the executable file that have been only infrequently executed. Rather, such infrequently executed instructions are emulated so that their frequency of execution may continue to be determined as described above. Although emulation typically is much slower than translation, the reduction in speed resulting from emulation is typically not great because of the infrequency of execution. Advantageously, the novel filtering out of infrequently executed instructions by the original instruction filter reduces the amount of memory that is used, and the time that would otherwise be spent, by other elements of the control-path-evaluating trace designator for the tasks of translating, instrumenting, analyzing, or optimizing infrequently executed instructions. Also advantageously, the continued emulation of infrequently executed instructions in order to test for frequency permits the original instruction filter to be responsive to a change in the dynamic behavior of the executable file. Thus, original instructions that were filtered by the hot trace detection instrumenter and therefore not translated or optimized may, during another phase of execution, be identified by the hot trace detection instrumenter as frequently executed and consequently translated and considered for optimization, as described above.

In an alternative embodiment, the trace designator may also include a cold trace manager. The cold trace manager reevaluates hot traces to determine if they, in whole or part, remain hot; that is, to determine whether they continue to be frequently executed. If a hot trace is no longer frequently executed, the cold trace manager identifies such trace as a cold trace. In one implementation of this embodiment, a portion of a hot trace may remain hot while another portion is designated as cold. In one implementation of this embodiment, an optimized hot trace, or portion thereof, that has become cold may be given a grace period during which it remains hot but will be considered cold if reevaluation continues to indicate that it is cold after the grace period. Advantageously, such reexamination in accordance with any of the foregoing aspects or embodiments further permits the designator to be responsive to changes in the dynamic behavior of the executable file.

In an alternative embodiment, optimized instructions corresponding to previously hot traces may be eliminated from memory (pruned) by the cold trace manager if such traces have become cold, thus providing space in memory to store optimized instructions corresponding to traces that have become hot while such traces have become cold.

In one embodiment, the trace designator also includes a backpatch manager. Blocks that are translated by the block translator and instrumenter are examined by the backpatch manager to determine if any other previously translated, or optimized, block transfers control to the newly translated block. If so, then the control transferring jump or fall-through instruction is backpatched; that is, it is changed so that control transfers directly to the newly translated block. Without such backpatching, if the previously translated or optimized block were again to be executed, control would typically pass to the hot trace detection instrumenter. It will be appreciated that without action from the backpatch manager the transfer of control may alternatively further pass to the trace selector. In one aspect of the invention, the hot trace detection instrumenter would note that such block transferred control to the newly translated block and would thus pass control to it. Advantageously, the backpatching eliminates the additional step of returning to the hot trace detection instrumenter. Rather, control passes directly from the jump or fall-through instruction in the previously translated or optimized, and now re-executed, block to the newly translated block.

In another embodiment, the backpatch manager similarly examines blocks that are optimized by the optimizer. That is, such optimized blocks are examined to determine if any other previously translated, or optimized, block transfers control to the newly optimized block. If so, then the control transferring jump instruction is backpatched; that is, it is changed so that control transfers directly to the newly optimized block. Advantageously, such backpatching eliminates indirect control paths that would otherwise be taken from the previously translated or optimized block to the original instruction filter or to the translated block from which the optimized block was optimized, and thence to the newly optimized block. Rather, control passes directly from the previously translated or optimized, and now re-executed, block to the newly optimized block. Thus, advantageously, the translated block from which the optimized block was optimized may be eliminated from memory since all transfers to it have been backpatched to transfer to the optimized block.

In another embodiment, the backpatch manager similarly examines blocks that are pruned by the cold trace identifier. That is, such pruned blocks are examined to determine if any other previously translated, or optimized, block has a jump instruction that jumps to the newly pruned blocks. If so, then such jump instruction is backpatched; that is, it is changed so that control jumps to the original instruction storage area and the backpatch manager replaces a jump or fall-through instruction in a hot block to the corresponding original instruction in the original instruction storage area. Thus, the backpatch manager works on cold traces in the reverse manner that it works on hot traces.

Translation is the process of generating executable code from the emulated executable code and according to the present invention, the trace translator may improve the efficiency of computer resource usage by advantageously changing and inserting instructions. Since code often includes repetitive processing instructions such as loops and recursion constructs, the present invention may employ the trace translator to optimize the code. The trace translator may also change the code to eliminate unnecessary code jumps. The present invention trace translator employs a critical optimization technique for improving computer execution by exploiting opportunities to delete or change code instructions, such as unnecessary repetitive instructions. In one embodiment of the present invention during translation, intermediate code is created from executable code and rearranged to execute faster, and executable code is created from the rearranged intermediate code. The present invention maintains data in computer memory and does not write any intermediate data to disk.

The present invention may typically be implemented in software and for purposes of illustration references herein are to a software implementation. It will be understood by those skilled in the art that the present invention, an optimization tool, may be implemented in software, firmware, hardware, or any combination thereof.

Since the dynamic translation process occurs in computer memory, and the present invention executes within the user process and under the instruction flow of the user process, the translation process overhead is minimized and thereby performance over past dynamic tools is significantly improved. The execution process may be incrementally repeated to take advantage of the information provided by the translation tool. Additionally, the knowledge of the actual execution path supports user process code instruction debugging, and a refined use of dynamically loadable libraries, such as the C programming dll library. That is, since the actual execution path is known to the dynamic tool, the tool will only need to access the necessary dynamically loadable libraries.

Other aspects and advantages of the present invention will become apparent from the following detailed description, taken in conjunction with the accompanying drawings, illustrating by way of example the principles of the present invention.

DETAILED DESCRIPTION

Figure 1:
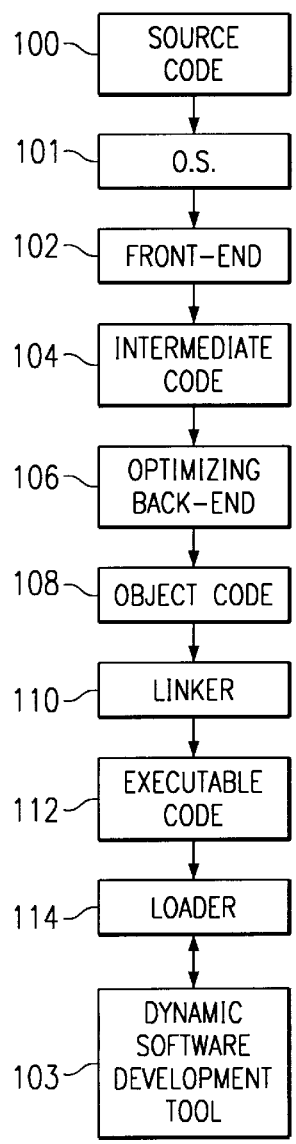
FIG. 1 is an illustration of the compiler technology of the present invention.

As shown in the drawings for purposes of illustration, the present invention is a dynamic translator that is an improved computer implemented software development tool. The dynamic translator emulates and translates a user process in memory during run-time and follows the control flow of a sequence of user process instructions. The present invention may translate a sequence of user process instructions and is not constrained by programming process control constructs such as procedure block boundaries. The dynamic translator emulates and translates the user process by applying machine state information such as the state of registers, condition codes, and hardware-specific parameters to determine critical execution paths of user code.

The dynamic translator is a form of computer system compiler technology. For a general discussion of existing compiler and translation tool technology, see *Principles of Compiler Design*, by Alfred V. Aho and Jeffrey D. Ullman (Addison-Wesley, 1977), which is herein incorporated by reference in its entirety as background. For an advanced discussion of existing compiler technology, see *Advanced Compiler Design and Implementation*, by Steven S. Muchnick (Morgan Kaufmann Publishers, (1997), which is herein incorporated by reference in its entirety as background.

Additionally, U.S. patent application entitled "SYSTEM AND METHOD FOR JUMP-EVALUATED TRACE DESIGNATION" attorney docket number 10971492-1, naming as inventors James S. Mattson, Jr., Lacky V. Shah, and William B. Buzbee, assigned to the assignee of the present invention and filed concurrently herewith is herein incorporated by reference in its entirety. U.S. patent application entitled "SYSTEM, METHOD, AND PRODUCT FOR CONTROL-PATH-EVALUATED TRACE DESIGNATION," attorney docket number 10971147-1, naming as inventors Manuel E. Benitez, James Mattson, Jr., William B. Buzbee, and Lacky V. Shah, assigned to the assignee of the present invention and filed concurrently herewith is herein incorporated by reference in its entirety.

In the following detailed description and in the several figures of the drawings, like elements are identified with like reference numerals.

In this detailed description and for convenience of illustration, references are made to various functional modules of the present invention that may be implemented in software. It will be appreciated that the functional models described herein could be implemented in hardware, firmware, or any combination thereof.

FIG. 1, is an illustration of the compiler technology used by the dynamic software development tool. As shown in FIG. 1 the present invention is a form of compiler technology that may use software source code 100 that is generated from an input computer (not shown). It will be appreciated that the present invention operates on any multi-purpose computer (not shown). A software developer may create source code 100 typically in a high-level programming language, one of many possible examples of which is the "C" language. The computer system may manage the processing of the source code 100 through a computer operating system 101 that may direct the source code 100 to be processed by a compiler front-end 102. The compiler front-end 102 may generate intermediate code 104 from the source code 100 and may operate on high-level intermediate code 104. The front-end 102 may optimize code while preserving the structure and sequence of source operations. For instance, the front-end 102 may optimize array contents while retaining the array accesses in the source code 100.

Optimization techniques employed by the compiler front-end 102 of FIG. 1 may generate intermediate code 104 that is processed by an optimizing back-end 106. The intermediate code 104 is a list of assembly language instructions and the dynamic software development tool 103 may operate on the intermediate code 104. If the code semantics can be preserved, the optimizing back-end 106 may identify instructions that are performed less frequently, thereby isolating frequently used instructions for further optimization. The optimizing back-end 106 may generate object code 108 that includes optimization changes which may be dependent on the particular multi-purpose computer on which the compiler optimizer technology operates. These machine-specific changes may allow the optimizing back-end to generate code that is highly tailored to optimally run on a specific multi-purpose computer; for example different cache memory size access techniques might be used to avoid inadvertent and unauthorized writing to computer memory. Further, the optimizing back-end 106 may execute the intermediate code 104 more than once and thereby may make iterative changes in the intermediate code 104 to enhance further processing by the optimizing back-end 106. In the present invention the linker 110 may operate on the output of the back-end 106 which may be object code 108. In order to execute the object code 108 it must be combined, or linked, with one or more object code modules to create combined user process executable code 112 by a process known as linking. The present invention employs a linker 110 to resolve any undefined computer location references in the object code 108 and to generate executable code 112 capable of executing on an output multi-purpose computer. It will be appreciated that the input computer and the output computer may be the same computer.

The executable code 112 is formatted to enable a loader 114 to load the executable code 112 into the computer for instruction execution. The executable code 112 may be any of a variety of known executable files or an executable file of a type to be developed in the future. Examples of such known files are those having an extension of ".exe" operating under a DOS or WINDOWS operating system or an "a.out" file of a UNIX® operating system.

The present invention is a dynamic software development tool 103 that operates during the run-time phase of execution and provides code that executes during the execution of the user executable code 112. The present invention advantageously combines the execution of the dynamic software development tool 103 with the execution of the user executable code 112 to enable the loader 114 to generate output that may be accessed by a user computer system.

Figure 2:
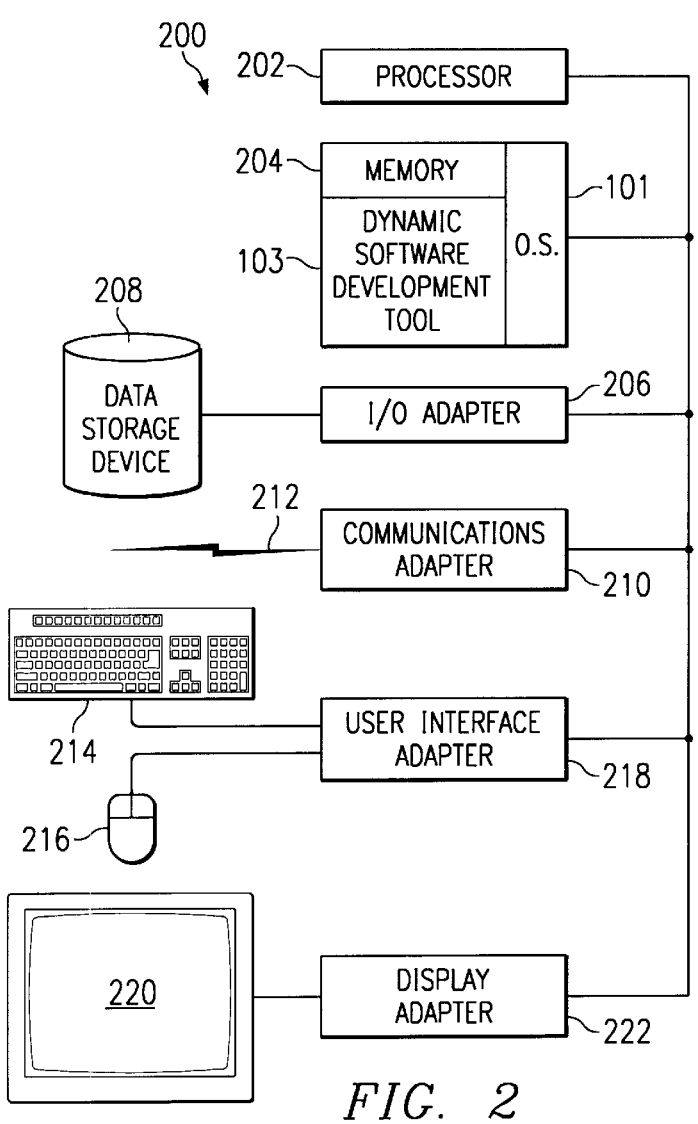
FIG. 2 is a block diagram of the hardware and software modules that interoperate in a computer system that executes the dynamic translator tool.

FIG. 2 is a block diagram of the hardware and software modules that interoperate in a computer system 200 that executes the dynamic software development tool 103. The computer system 200 includes components such as a processor 202, a memory 204, a data storage device 208, an I/O adapter 206, a communications adapter 210 and a communications network 212, a user interface adapter 218, a keyboard 214, a mouse 216, a display adapter 222, and a computer monitor 220. It will be understood by those skilled in the relevant art that there are many possible configurations of the components of the computer system 200 and that some components that may typically be included in the computer system 200 are not shown.

It will be understood by those skilled in the relevant art that the functions ascribed to the dynamic software development tool 103, or any of its functional modules, typically are performed by the central processing unit, that is embodied in the present invention as the processor 202, executing such software instructions, typically in cooperation with other modules in the computer system 200 such as the computer operating system (O.S.) 101. Henceforth, the fact of such cooperation among the processor 202, the O.S. 101 and the modules of the invention, whether implemented in software, hardware, firmware, or any combination thereof, may therefore not be repeated or further described, but will be understood to be implied. In particular, the cooperative functions of the O.S. 101, which are well known to those skilled in the relevant art, may be omitted for clarity.

It will also be understood by those skilled in the relevant art that the functions ascribed to the dynamic software development tool 103 and its functional modules, whether implemented in software, hardware, firmware, or any combination thereof, may in some embodiments be included in the functions of the O.S. 101. That is, for example, O.S. 101 may include modules of the dynamic software development tool 103. In such embodiments, the functions of the dynamic software development tool 103 may be described with reference to the execution by the processor 202 but without reference to cooperation with a separate O.S. 101. In such embodiments, the functions ascribed to the dynamic software development tool 103, or any of its functional modules, typically are performed by the processor 202 executing such software instructions in cooperation with aspects of O.S. 101. Therefore, in such embodiments, cooperation by the dynamic software development tool 103 with aspects of an O.S. 101 will not be stated, but will be understood to be implied.

Processor 202 may be a commercially available processor such as a PA-RISC processor made by Hewlett-Packard Company, or it may be one of other processors that are or will become available. Processor 202 executes the O.S. 101, which may be, for example, one of the DOS or Windows NT operating systems from the Microsoft Corporation; or a UNIX® operating system available from many vendors such as Hewlett-Packard; another or a future operating system; or some combination thereof. The operating system 101 interfaces with firmware and hardware in a well-known manner, and facilitates processor 202 in coordinating and executing the functions of the other components of the computer system 200.

Memory 204 may be any of a variety of known memory storage devices or future memory devices, including, for example, any commonly available random access memory (RAM), cache memory, magnetic medium such as a resident hard disk, or other memory storage device. In one embodiment of the present invention, the O.S. 101 and the dynamic software development tool 103 reside in the memory 204 during execution.

The data storage device 208 may be any of a variety of known or future devices, including a compact disk drive, a tape drive, a removable hard disk drive, or a diskette drive. Any such program storage device may communicate with the I/O adapter 206, that in turn communicates with other components in the computer system 200, to retrieve and store data used by the computer system 200. As will be appreciated, such program storage devices typically include a computer usable storage medium having stored therein a computer software program and data.

Input devices could include any of a variety of known input-output (I/O) devices for accepting information from a user, whether a human or a machine, whether local or remote. Such devices include, for example a keyboard 214, mouse 216, touch-screen display, touch pad, microphone with a voice recognition device, network card, or modem. The input devices may communicate with a user interface I/O adapter 206 that in turn communicates with components in the computer system 200 to process I/O commands. The output devices could include any of a variety of known I/O devices for presenting information to a user, whether a human or a machine, whether local or remote. Such devices include, for example, a video monitor 220, printer, audio speaker with a voice synthesis device, network card, or modem. Output devices such as the monitor 220 may communicate with the components in computer system 200 through the display adapter 222. Input-output devices could also include any of a variety of known data storage devices 208 including a compact disk drive, a tape drive, a removable hard disk drive, or a diskette drive.

By way of illustration, the executable code 112 (as shown in FIG. 1) may typically be loaded through an input device and may be stored on the data storage device 208. A copy of the executable code 112 or portions of it, (hereafter, simply referred to as executable code 112) may alternatively be placed by the processor 202 into the memory 204 for faster execution. In the illustrated embodiment, it will be assumed for clarity that the O.S. 101 causes the processor 202 to place the instructions and data of the executable code 112, constituting what is referred to herein as the user code instructions, or instructions, in the memory 204 for execution.

The computer system 200 may communicate with a network 212 through a communications adapter 210. The network may be a local area network, a wide area network, or another known computer network or future computer network. It will be appreciated that the input-output device used by the dynamic software development tool 103 may be connected to the network 212 through the communications adapter 210 that may not be co-located with the computer system 200. It will be further appreciated that other portions of the computer system, such as the data storage device 208 and the monitor 220, may be connected to the network 212 through the communications adapter 210 and may not be co-located.

The dynamic software development tool 103 may be implemented in the "C" programming language, although it will be understood by those skilled in the relevant art that many other programming languages could also be used. If implemented in software, the dynamic software development tool 103 may be loaded into the memory 204 through one of input-output devices. Preferably, all or portions of the dynamic software development tool 103 may also reside in a read-only memory or similar device of memory 204, such devices not requiring that the dynamic software development tool 103 first be loaded through input-output devices. It will be understood by those skilled in the relevant art that the dynamic software development tool 103, or portions of it, may typically be loaded by the processor 202 in a known manner into the memory 204 for execution.

In this detailed description, references are made to various functional modules of the present invention that may be implemented either in software, hardware, firmware, or any combination thereof. For convenience of illustration, references generally are made to implementations in software. Such references therefore typically refer to software-implemented functional modules that will be understood to comprise sets of software instructions that cause described functions to be performed.

In one embodiment, the present invention is directed to a computer program product comprising a computer usable medium having control logic such as a computer software program including program code, stored therein. The control logic, when executed by the processor, causes the processor to perform the functions of the invention as described herein.

Figure 3:
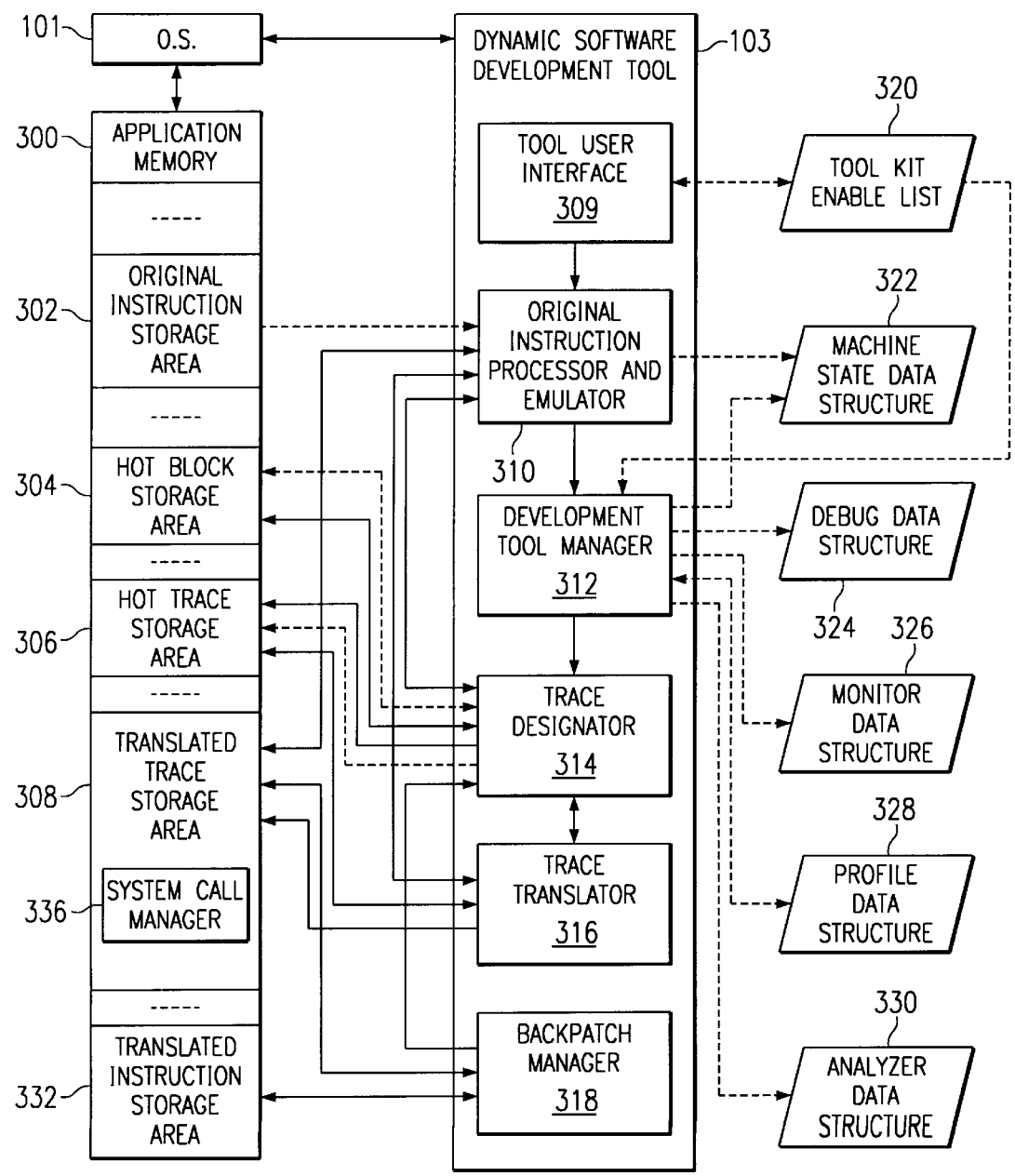
FIG. 3 is a flow diagram of the elements of the dynamic software development tool, the data structures generated and used by the software development tool, and the computer memory that is changed and accessed by the software development tool.

In one embodiment of the present invention the dynamic software development tool 103 as shown in FIG. 3 communicates with the O.S. 101 by accessing machine state information from the machine state data structure 322 and creating new system states as a result of processing. The application memory 300 is managed by the O.S. 101 and used by the dynamic software development tool 103 and includes storage areas such as: an original instruction storage area 302, a hot block storage area 304, a hot trace storage area 306, a translated trace storage area 308, and a translated instruction storage area 332. The application memory 300 is also referred to in the description of FIG. 4. The dynamic software development tool 103 communicates with the O.S. 101 by a tool user interface 309 that accepts information from the O.S. 101, that may be provided in an application or when the tool is invoked, and passes that information on to the tool kit enable list 320 and the original instruction processor and emulator 310. This includes an original instruction processor and emulator 310, that in cooperation with the O.S. 101 and processor 202 (as shown in FIG. 2), assumes control over the execution of original instructions of executable code 112 that are stored in the original instruction storage area 302. More detail about the original instruction processor and emulator 310 is discussed in connection with FIG. 5. The original instruction processor and emulator 310 fetches an instruction from original instruction storage area 302, typically starting with the first original instruction Such fetching is carried out in accordance with any of a variety of known techniques. The original instruction processor 310 also selectively directs control among the development tool manager 312 and the trace translator 316. For instance, the original instruction processor 310 may determine that instruction translation is more efficient than instruction emulation and may therefore transfer processing control to the trace translator 316. On the other hand, if the original instruction processor 310 determines that instruction emulation is most efficient the original instruction processor 310 will proceed to emulate the original instruction.

The original instruction processor and emulator 310 as shown in FIG. 3 may pass processing on to the development tool manager 312 that enables a user to indicate whether a debugging, a monitoring, a profiling, a software simulation, or an analyzer tool shall be enabled and executed with the dynamic software development tool 103. Software debugging, monitoring, and profiling tools use the dynamic software development tool to maintain the state of the original user process code. Software simulation tools require the dynamic software development tool to update in memory the state of the original user process during the execution of the translated code. Software analyzer tools access run-time machine state information from the dynamic software development tool 103 and may, for instance, thereby predict future behavior of software code. The enabling information is stored by cooperation with the O.S. 101 in a tool kit enable list 320. The development tool manager 312 operates on the emulated or translated instructions from the original instruction processor 310 to obtain directive information from the tool kit enable list 320. The directive information from the tool kit enable list 320 will trigger the development tool manager 312 to access and log appropriate information in computer data structures.

There are a number of software tools that augment software development and which can be included in the present invention such as, a debugging tool, a monitoring tool, a profile tool, a software simulation tool, and an analyzer tool. For example, the development tool manager 312 may determine that the debug tool trigger has been enabled and may store user-level information from the original instruction processor and emulator 310 related to debugging in the debug data structure 324. Further, the development tool manager 312 may determine that the monitor tool trigger has been enabled and may store user-level information from the original instruction processor and emulator 310 related to monitoring in the monitor data structure 326. The development tool manager 312 may also determine that the profile tool trigger has been enabled; may store machine-level information in the machine state data structure 322 related to profiling, and may store profiling information in the profile data structure 328. Further, the development tool manager 312 may retrieve information from the profile data structure 328 to dynamically alter the subsequent directives of the development tool manager 312 for the purpose of adapting program execution based on profile data. The development tool manager may determine that the software simulation tool trigger has been enabled and may create new program state values and store the new program state values in the machine state data structure 322 for the purpose of software simulation during the execution of the translated code. The development tool manager 312 may also determine that the analyzer tool trigger has been enabled and may store information from the original instruction processor and emulator 310 in the analyzer data structure 330, and for instance, the stored information may enable the prediction of future behavior of software code. The analyzer tool may also work in cooperation with the profile tool and may retrieve information from the machine state data structure 322 for logging to the analyzer data structure 330 that may be used by the profile tool. More particularly, examples of the types of information generated and used by these tools are discussed in connection with FIG. 4. It will be appreciated that the development tool manager enables the use of the augmenting tools that execute with the translated executable code and with the emulated executable code, and thereby the user gains the advantage of more efficient execution of code while enhancing the software development process with co-executing augmenting tools.

As further shown in FIG. 3 development tool manager 312 passes processing onto a trace designator 314. In one embodiment of the present invention, a trace designator 314 designates groups of instructions, referred to as traces, for dynamic translation based on an evaluation of control flow. The trace designator 314 detects and optimizes at least one hot trace, if present, in the executable code 112 (as shown in FIG. 1). A trace is made up of one or more basic blocks of the executable code 112, each of which may be reached through a common control path. Advantageously, the trace designator 314 selects hot traces for optimization based on the dynamic behavior of the executable code 112. In one implementation of this embodiment, a trace is determined to be a hot trace if execution of the translated block has resulted in control being passed through the block more than a predetermined number of times. In alternative implementations, a block is determined to be a hot trace if control passes through it more than a predetermined number of times in a predetermined time period, or, in a period between two or more events related to the execution of the executable code 112, or in accordance with a combination of the preceding conditions. That is, a trace is typically identified as a hot trace based on the actual course of execution over a trial period rather than on an estimate made at compile time, or a projection based only on initial execution of how the file will execute.

In one embodiment, the trace designator 314 translates the original instructions of the executable code 112 into translated instructions and more detail about the trace designator 314 is discussed in connection with FIG. 6. Original instructions are correlated with their corresponding translated instructions, if any, in either the hot block storage area 304 or the hot trace storage area 306. Thus, a match of the current original instruction with an instruction in either the hot block storage area 304 or the hot trace storage area 306 indicates that such instruction has been translated and is stored either in hot block storage area 304, hot trace storage area 306, or both. If a match is found with a translated instruction in hot trace storage area 306, the trace designator 314 transfers control to such corresponding translated instruction. If there is no such match, but there is a match with a translated instruction in hot block storage area 304, the trace designator 314 transfers control to such corresponding translated instruction. In either case, such translated instruction is then executed, and control flow proceeds in accordance with such execution. For instance, control flow may proceed from the trace designator 314 back to the trace translator 316 and to the translated trace storage area 308 which then transfers processing control to the original instruction processor and emulator 310 for fetching and processing of another instruction. Alternatively, control flow could proceed from the trace designator 314 directly back to the original instruction processor and emulator 310; or the trace translator 316 may transfer control flow directly back to the trace designator 314. Advantageously, the translated and instrumented instructions may provide monitoring of the dynamic behavior of the execution of the executable code 112 with much less loss of speed than typically would occur by alternative techniques.

For example, if the original instructions of the executable code 112 had been emulated in order to monitor such dynamic behavior, the loss of speed would typically be many times greater than the loss of speed that typically occurs by executing translated instructions due to managing the overhead associated with the machine states. Also advantageously, by deferring optimization of instructions until it is determined that a trace is executed frequently, the likelihood is increased that the increase in speed achieved by optimization, the effects of which are multiplied by frequent usage, will offset such costs of optimization.

Trace Translator 316

Also as shown in FIG. 3 and in accordance with any of a variety of known techniques, a trace translator and optimizer 316 (hereafter, simply "trace translator 316") translates and optimizes the current trace. Such translated and optimized instructions are stored by the trace translator 316 in the translated instruction storage area 332. The addresses of such instructions in storage area 308 are generally referred to hereafter as "translated instruction addresses." In a known manner, the translator 316 provides that transfers out of the translated instruction addresses are made to a backpatch manager 318. More detail about the backpatch manager 318 is discussed in connection with FIG. 7.

The translation process creates a virtual machine environment. A virtual machine is a software copy of the computer system environment values for a specific computer system. The virtual machine creates a computer system environment which can be executed, and the execution of software instructions on the virtual machine is equivalent to executing the software instructions in the specific computer system.

Emulation and translation may occur at a trace-level. Also, advantageously, the translation tool creates intermediate code from the executable code and rearranges the intermediate code to execute faster, and creates translated executable code from the rearranged intermediate code. The advantages of trace-level translation are for performance, to increase the rate of execution. Translated code executes more efficiently than emulated code, but the initialization overhead is significantly higher for translated code. The following activities are representative of translation initialization overhead: loading and transition jumps, analysis of optimizing code for traces, low-level optimization from machine code as a starting point, data flow analysis, and assertion propagation. Those skilled in the art will appreciate the effort associated with these operations.

Tracing has an advantage over static compiler-technology tools in that the trace tool can control branches. Because the tool can generate multiple traces, it can always rearrange blocks to force entry into the block from the initial point in a code block, which creates a more predictable execution flow. An example of a trace-level translation performance improvement opportunity is advantageously recognizing that a conditional instruction may be implemented so that one result of the condition will execute the next code instruction, a fall-through instruction; and the other result of the condition will execute a jump instruction. When a branch instruction occurs in the code, a fall-through instruction will generally be quicker than a conditional branch instruction. If a conditional branch instruction is usually taken the trace selector can switch the blocks associated with the branch instruction to ensure that a fall-through instruction and not a conditional branch instruction occurs most often.

The join instruction is another example of benefits from the trace selector. If two code blocks are associated by a branch instruction but actually execute as though they are effectively joined, the trace selector can eliminate the branch instruction to the second block and pass execution between the blocks sequentially.

By deferring optimization of instructions until it is determined that a trace is executed frequently, the dynamic behavior of the flow of control is based on actual operating conditions and usage rather than estimates based on the structure of the executable code such as, for example, the presence of loops, branches, switches, or other structural indicators. For example translation initialization overhead is incurred in a software function invocation and return action. In the following example as shown in Table 1 that illustrates translation initialization overhead, the software function f(a) returns "a+2". When "a+2" is substituted for the function f(a) the value of "b" becomes "a+2" and therefore, by substitution "b" equals three and "c" equals four. The overhead in this example includes executing a jump instruction to the function f(a) and resolving the value for the substitution of f(a). By completing all calculations and substitutions "a" and "b" acquire simple, integer values.

In this example, the translation overhead is acceptable in an optimizing dynamic translator only if the number of times "a" and "b" are accessed is greater than a pre-set threshold. For example if the pre-set threshold is a specified value, therefore the savings from the speed-up time for the access to "a" and "b" exceeds the overhead of the execution of the function f(a) a specified number of times. That is, assuming that the value of "a" and "b" can be maintained in the user process memory, then if the number of accesses to "a" and "b" exceeds the pre-set threshold value, the translation initialization overhead of resolving the values of "a" and "b" is less than the non-translated access to f(a) and is thereby a more efficient code implementation.

TABLE 1

Translation Initialization Overhead

| a = 1; | |
| b = f(a); | |
| c = b + 1; | |
| . . . | |
| f(a); | |
| ret; | |
| a + 2; | |
| . . . | |
| a = 1; | |
| b = a + 2; | b = 1 + 2 = 3; |
| c = b + 1; | c = 3 + 1 = 4; |

Also as shown in FIG. 3 and in accordance with any of a variety of known techniques, the backpatch manager 318 backpatches translated jump or fall-through instructions so that they pass control to target instructions that have also been translated, when present. By accessing data in the translated trace storage area 308 the backpatch manager 318 determines if the current original instruction has been translated. If it has, control is transferred to the translated instruction address in the translated instruction storage area 332 for execution. Also as noted, transfers out of the translated instruction storage area 332 may be made to the backpatch manager 318. The transfer of processing control to the translated trace storage area 308 will effectively transfer processing control back to the original instruction processor and emulator 310 when another original instruction is to be executed.

As further shown in FIG. 3, those skilled in the art will appreciate that during execution on some operating systems such as a UNIX® operating system, a process can spawn a new process which may take control of the flow of execution and therefore the original process may no longer be in control of execution. The system call contains instructions which can spawn a new process. The trace translator 316 will normally function more efficiently if it retains control of the user process. During normal processing when the system call spawns a new process it will execute the user code as opposed to merely using the user code only as data for the trace translator 316. Therefore the present invention includes a system call manager 336 that avoids loss of control of the user process by the trace translator 316.

The system call manager 336 recognizes a system call in the translated trace storage area 308. If the system call will spawn a new process the system call manager 336 will intercept the system call and replace the system call with code from the trace translator 316 in the translated trace storage area 308, and execution will continue with the replaced call without changing control and spawning a new process.

The system call manger 336 is optional. For instance, if one were willing to lose control of the user process the system call manager 336 may not be necessary. Since there is some additional overhead created by the system call manager 336 a decision may be made to possibly permanently lose control of the user process via spawning the process rather than to absorb the cost of the system call manager 336 overhead.

Figure 4:
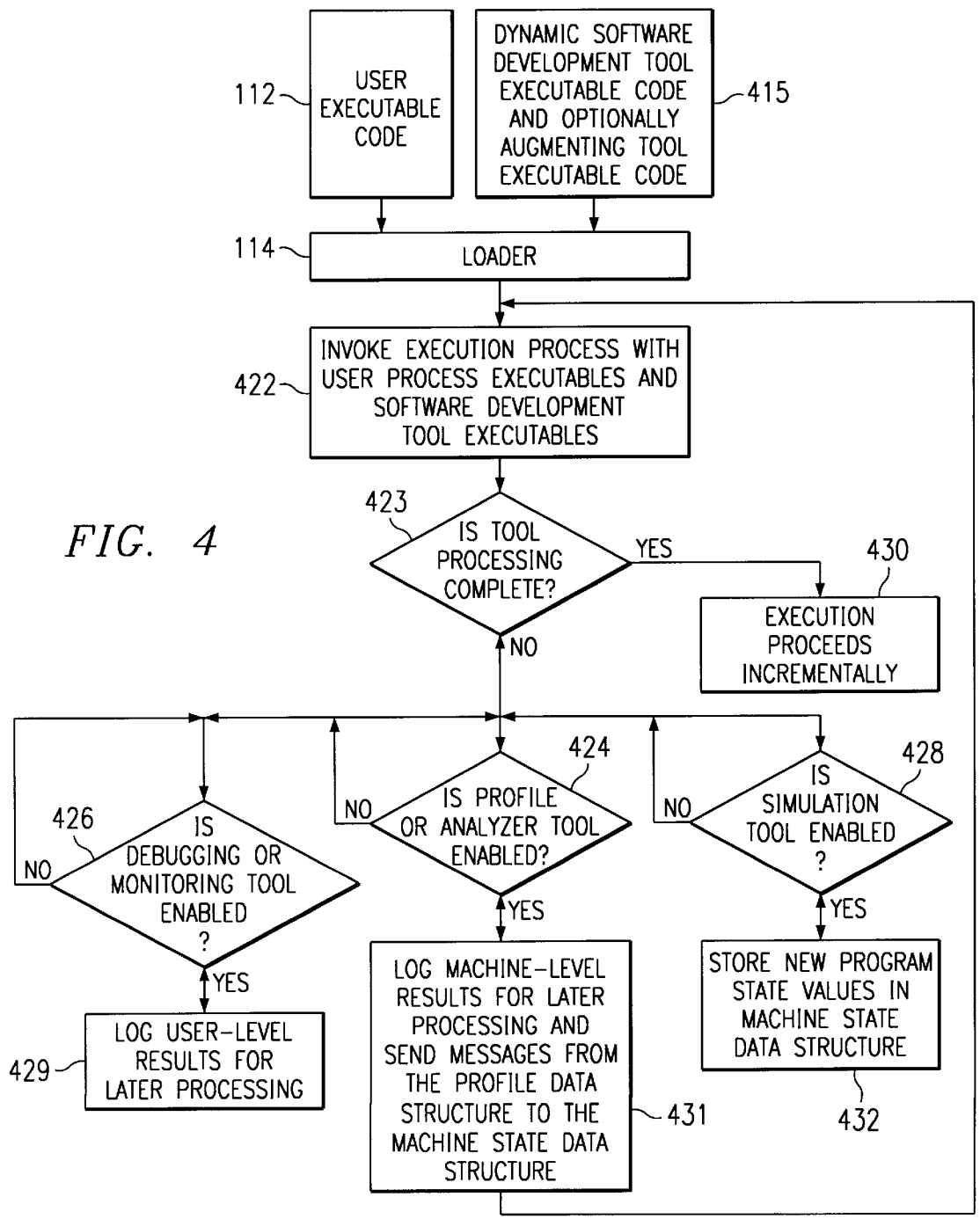
FIG. 4 is an illustration of the software development enabling tools that interoperate with the dynamic software development tool and augment the dynamic software development tool.

In one embodiment of the present invention and as shown in more detail in FIG. 4, a series of tools may optionally augment the dynamic software development tool, and the augmenting tools are enabled by including augmenting tool executable code with the dynamic software development tool executable code 415 in the loading process. The software development tool 103 contains executable code that applies the user executable code 112 as execution data thereby enabling the dynamic software development tool 103 to execute in cooperation with the user executable code 112. Therefore in step 422 the loader 114 will cooperate with the dynamic software development tool executable code 415 and the user executable code 112 to invoke the execution process using the user executable code 112 as data that is processed by the dynamic software development tool executable code 415. During the invocation of the execution process of the user executable code 112 and the dynamic software development tool executable code 415 the present invention will determine if augmenting software development tools have been enabled by including augmenting tool executable code with the dynamic software development tool executable code in step 415.

The present invention advantageously provides an interface to enable the use of a number of run-time software tools. The dynamic software development tool 103 may be augmented with a profiling tool that maintains the state of the user process and may keep track of information about the user process such as system call instances and the frequency of particular opcode use, by storing the information in the profile data structure 328. Those skilled in the art will appreciate the use and significance of tracking this information. The profiling tool may also store information in the machine state data structure 322 for the purpose of adapting program execution based on profile data. Therefore the software development tool 103 may execute the user code that improves execution performance and also execute profiling executable code that accesses profile information and alters the emulated and translation instructions used in subsequent user code execution.

Since the present invention operates at run-time it provides a method for an analyzer tool to take advantage of the dynamic translation process and adjust instruction flow based on the previous instruction execution results. The present invention may be augmented by an analyzer tool that reads the machine state information of the user process from the machine state data structure 322 and, for instance, may thereby predict future instruction execution behavior. The software development tool 103 may execute the user code and improve execution performance and also execute analyzer executable code that accesses analyzer information which may adjust instruction flow based on previous instruction execution results.

In step 423, when the tool processing is not complete, the present invention will, in step 424, test whether a profiling tool or an analyzing tool has been enabled. In step 424, the dynamic software development tool 103 will determine whether the profiling tool is enabled that uses computer machine-level information to adjust the source program execution path. In step 424, if the profiling tool is enabled, the machine-level results of the execution will be logged for later processing as illustrated in step 431, and in step 423 the dynamic software development tool 103 will continue to test for other tool enablement as a result of the processing. Further, in one embodiment of the present invention in step 424 the dynamic software development tool 103 will determine whether the analyzer tool is enabled; and in step 431 will log machine level results in the analyzer data structure 330 for later processing; and in step 423 will continue to test for other tool enablement as a result of the processing.

In step 428, one embodiment of the present invention will test if a simulation tool has been enabled, and if the simulation tool is enabled will update the machine state of the user process with the machine state of the translated code to allow experimentation of software execution under different machines using different machine states. It will be understood by those skilled in the art that machines states may include, for example, the machine state of registers, condition codes, and hardware-specific parameters. In step 432 when the present invention determines that the simulation tool has been enabled, the dynamic software development tool 103 will create new program state values and store the new values in the machine state data structure 322. The new program state values may be accessed by the dynamic software development tool 103 as subsequent instruction execution continues thereby adapting the directives for translation and execution based on the machine state changes of the simulation tool. Alternatively if the present invention determines that the simulation tool has not been enabled, the dynamic software development tool 103 will, in step 423, continue to test for other tool enablement as a result of the processing.

In one embodiment of the present invention and in step 426, as the dynamic software development tool 103 continues to test for tool enablement the dynamic software development tool will check for debugging or monitoring enablement. If the debugging or monitoring tool is enabled 326 the user-level results of the execution will, in step 429, be logged for later processing. By making machine state information available, debugging and monitoring tools provide valuable information to software developers, such as values associated with variables and the execution sequence of program instructions, and thereby contributes to improving software development productivity. Alternatively if the present invention determines that the simulation tool has not been enabled, the dynamic software development tool 103 will, in step 423, continue to test for other tool enablement as a result of the processing.

When the dynamic software development tool 103 determines that tool processing is complete, in step 423, the execution process may proceed incrementally and, in step 430, take advantage of information produced from the profiling and the analyzing tools. It will be understood that the tools are enabled during run time and consequently the execution of the tools may be incorporated in the execution of the user executable code 112, thus eliminating step 430.

Original Instruction Processor 310

Figure 5:
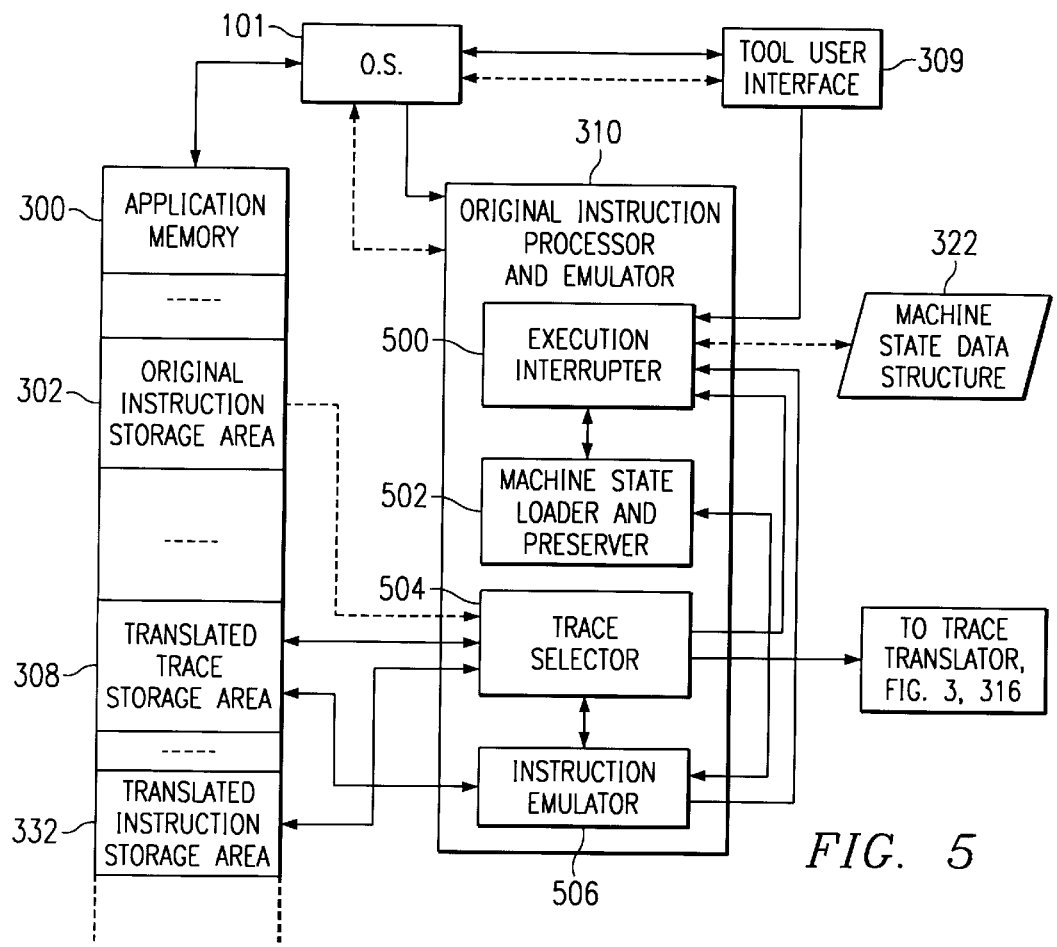
FIG. 5 is a flow diagram of the original instruction processor and emulator and includes the computer memory configuration that is changed and accessed by the original instruction processor and emulator.

As shown in greater detail in FIG. 5, the original instruction processor 310, in cooperation with the O. S. 101 and the processor 202 (as shown in FIG. 2), assumes control over the execution of original instructions of executable code 112. The original instruction processor 310 also selectively directs control among the instruction emulator 506, the trace selector 504, and the start-end designation of a trace stored in the translated trace storage area 308, and in the translated instruction storage area 332. During instruction processing and when the end of a translated trace is reached in the translated trace storage area 308, processing control will be transferred back to the trace selector 504 and then to the execution interrupter 500. In one embodiment of the present invention, the original instruction processor 310 includes the execution interrupter 500, the machine state loader and preserver 502, the trace selector 504, and the instruction emulator 506. The execution interrupter 500 suspends conventional instruction execution by the processor 202 and transfers control of instruction execution to the original instruction processor and emulator 310. The machine state loader and preserver 502 preserves the state of the user computer that existed prior to the operation of the trace designator 314 (as shown in FIG. 3), and reinstates such state after the trace designator 314 completes or terminates its operations using altered machine states. It will be appreciated that the machine state loader and preserver 502 stores machine state information in the machine state data structure 322. The trace selector 504 selectively directs control among various functional modules of the trace designator 314 and to translated instructions. That is, the trace selector 504 selectively directs control among the instruction emulator 506 and the trace translator 316, and translated and optimized instructions in the translated instruction storage area 332 and the translated trace storage area 308. Generally, the trace selector 504 directs control to the instruction emulator 506 to simulate execution of the original instructions until an original instruction is encountered that has already been translated, or an original jump instruction is encountered. If a previously translated original instruction is encountered, the trace selector 504 directs control to the corresponding translated instruction for execution. If a jump instruction is encountered, the trace selector determines if such jump instruction indicates an appropriate start or end of a trace.

Execution interrupter 500 and machine state loader and preserver 502: Generally, the execution interrupter 500 and the machine state loader and preserver 502 cooperate with the O.S. 101 to cause the processor 202 to pass control of execution of the original instructions to the execution interrupter 500 that in turn passes execution control to the machine state loader and preserver 502 to fetch and to save the current machine state of the processor 202. The execution interrupter 500 and the machine state loader and preserver 502 operate in accordance with any of a variety of known techniques. If the operation of the trace designator 314 should be terminated, either because such operations have been completed, an error condition has been detected, or for another reason, the preserved machine state values of the processor 202 are restored by the machine state loader and preserver 502 in a known manner and, in cooperation with the O.S. 101, and conventional instruction execution is returned to the processor 202.

As noted, the machine state loader and preserver 502 preserves the state of various machine values or conditions of the user computer, such as the values of registers, status flags, or system memory locations, prior to the altering of any such values or conditions by the trace designator 314. Therefore it will be seen that the trace designator 314 establishes an altered machine state. The machine state loader and preserver 502 also reinstates such values or conditions after the trace designator 314 completes or terminates its operations. Thus, the computer process state for the user is returned to its state prior to the operation of the trace designator 314. Such functions of the machine state loader and preserver 502 are accomplished in accordance with any of a variety of known techniques.

Instruction emulator 506. As noted, control passes to the instruction emulator 506 either if the number of occurrences of the target identifier of the current original instruction is less than the start-instruction frequency threshold, "F", or if the current original instruction is not a target instruction. Thus, the instruction emulator 506 emulates every original instruction except one that is identified as being a start of a hot block by the trace designator 314 (or has been identified by trace selector 504 as having a corresponding translated instruction, as noted below). It is now assumed for illustrative purposes that either the current original instruction is not a target instruction, or that its target identifier is found less than F times. Thus, the current original instruction is not the start of a hot block, and is therefore emulated.

The instruction emulator 506 mimics the operations that processor 202 would have applied to the current original instruction if the execution interrupter 500 and the machine state loader and preserver 502 had not suspended conventional instruction execution of executable code 112 by the processor 202. however, rather than the original instruction being executed, emulated instructions are executed. The emulated instructions execute using the user code as data thus preserving the flow of control of the user code. The results of such emulated instructions generally are identical to the results that would have been obtained by the execution of the current original instruction by the processor 202. In addition, the instruction emulator 508 preserves aspects of the status of the processor 202 that may be affected by the execution of the emulated instructions in the machine state data structure 322 and returns the processor 202 to such status after the instructions have been executed by emulation. Such emulation takes place in accordance with any of a variety of known techniques using software, firmware, hardware, or a combination thereof. After the instruction emulator 506 has emulated the current original instruction, it typically transfers control to the execution interrupter 500 and increments the program counter in a known manner.

Typically, the instruction emulator 506 causes instructions to be executed by emulation substantially more slowly, for example, 10 to 100 times more slowly, than the original instructions would have been executed by the processor 202. Such slowing down may be due to any of a variety of known factors. For example, the values of status flags, or values stored in registers or memory, may be required to be accessed, moved, their new location recorded, and subsequently accessed and moved back to their original locations. Such time-consuming operations may be necessary in order to avoid conflicts with the operations of the instruction emulator 506 itself or other elements of the trace designator 314. Such additional time consumed by emulation may generally be reduced by translating the current original instruction into a translated instruction or instructions to which control is then passed for execution. However, such translation, unlike emulation, requires that additional space be assigned in memory for a period longer than the time required for the initial execution. That is, the instruction emulator 506 emulates the instructions. Once the instructions are emulated, they typically are no longer present in memory, although it need not be so in another embodiment. In contrast, translated instructions are created and then typically stored in memory so that they may be executed repeatedly without being re-created. After emulating the current original instruction, the instruction emulator 506 passes control to the execution interrupter 500 to fetch another instruction.

Trace selector 504. Control may be passed by the instruction emulator 506 to the trace selector 504 so that the trace selector 504 may selectively direct control as noted while preserving the original flow of the user process code instructions. That is, the trace selector 504 selectively directs control among the instruction emulator 506 and the trace translator 316 (as shown in FIG. 3); and translated and optimized instructions in a translated instruction storage area and the translated trace storage area may be processed, and may transfer control to the trace selector 504 and back to the execution interrupter 500 to process another original instruction. The trace selector 504 may optionally fetch an instruction from original instruction storage area 302, typically starting with the first original instruction, and such fetching is carried out in accordance with any of a variety of known techniques. Recall that the original instruction most recently fetched by the trace selector 504 is referred to as the current original instruction.

Provided that a unique identifier of the current original instruction has not already been assigned, the trace selector 504 assigns the unique identifier and temporarily stores such identifier in an appropriate location in application memory 300 so that it may be accessed by other functional modules, as described below. In one embodiment, a hash-table entry representing the address of the current original instruction in original instruction storage area 302 advantageously serves as its unique identifier. However, any other technique that enables the address of the current original instruction to be determined from such unique identifier may be used in alternative embodiments. In one embodiment, it is not material to the present invention whether such unique identifier is the absolute address of the current original instruction, its address relative to a base address, an address obtained from a hash table, or another known representation. Moreover, in alternative embodiments, not all original instructions need be assigned a unique identifier. In some aspects of such alternative embodiments, only original instructions that are target instructions are assigned a unique identifier. Having fetched the current original instruction and assigned a unique identifier to it, the trace selector 504 determines to which functional module, or to which translated instruction, control should pass. Such determination depends generally on the frequency with which control has passed to the current original instruction and is determined by the trace designator 314.

Trace Designator 314

Figure 6:
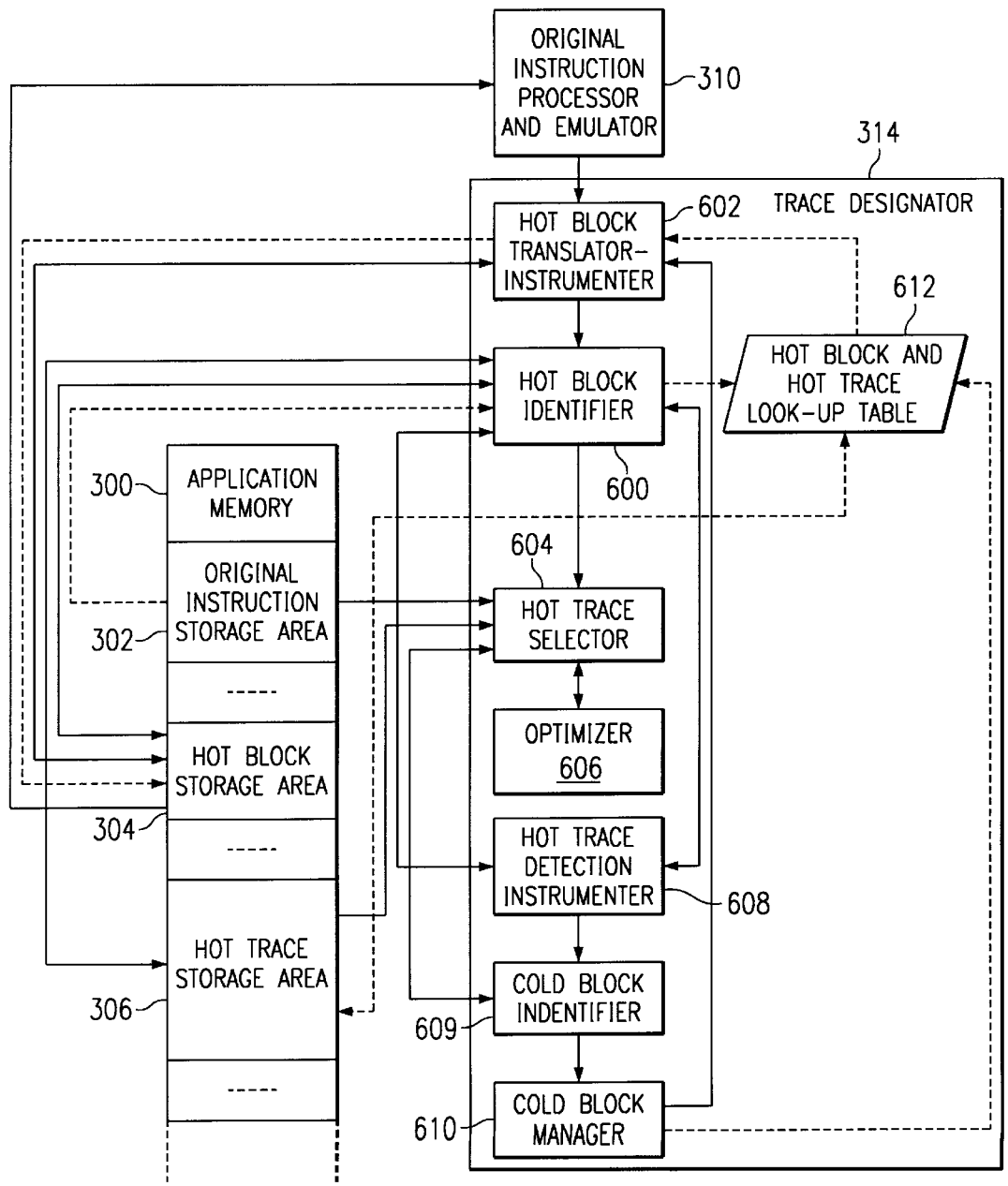
FIG. 6 is a flow diagram of the trace designator and includes the computer memory configuration that is changed and accessed by the trace designator.

As show in FIG. 6, the execution control flow of the present invention may pass to the trace designator 314 by the original instruction processor and emulator 310 or by the development tool manager 312. The trace designator 314 may analyze code to determine critical execution paths by counting sections of code, such as blocks of code, to assess those frequently repeated blocks of code. A block typically is a sequence of instructions of executable code that has only one entrance into the block and the entrance is the first instruction in the sequence of instructions. A block may also consist of a single instruction. A block has at least one exit instruction that passes control from the block to a different block. In the present invention the blocks need not necessarily be laid out sequentially in the original code. However, in the code used by the trace designator 314 the blocks will be analyzed on the basis of their sequential flow pattern. In a basic block sequence of instructions, if the first instruction is executed, all other instructions in the basic block will be executed.

Recall that herein, a control path from one basic block to another basic block is referred to as an arc and transferring control over an arc may occur by either an unconditional fall-through or a jump. An unconditional fall-through is the act of passing control from a first instruction to the instruction immediately following the first instruction, and a jump passes control to an instruction that does not immediately follow the first instruction. An instruction that causes a jump to occur is referred to herein as a jump instruction. A basic block usually ends with a jump instruction which transfers control to another basic block. The instruction to which the jump instruction passes control may be referred to as a target instruction.

Hot Trace Selector—A trace is made up of one or more blocks of executable code, each of which may be reached through a common control path. A hot trace is a trace that is frequently executed. Advantageously, the invention selects hot traces for performance optimization based on the dynamic behavior of the executable code. In one embodiment, a hot trace selector 604 receives a hot block identifier and designates a hot trace. In such illustrative embodiment, the blocks through which such a frequently traveled control path flows are designated by the hot trace selector as a hot trace.

The trace designator 314 may selectively direct control to a corresponding translated instruction if the current original instruction has been translated. In one embodiment, the trace designator 314 performs this function by determining if the current original instruction is part of a basic block that is currently identified as a hot block. Alternatively, the trace designator 314 determines if the current original instruction is part of a current hot trace.

The trace designator 314 performs these functions by applying any of a variety of known techniques, such as search and compare techniques, to compare the unique identifier of the current original instruction with a table of unique identifiers. For instance, original instructions are compared with their corresponding translated instructions, if any, in either hot block storage area 304 or hot trace storage area 306 by matching the unique identifier of the current original instruction with one that indicates that such instruction has been translated and is stored either in hot block storage area 304, hot trace storage area 306, or both. If a match is found with a translated instruction in hot trace storage area 304, the trace designator 314 transfers control to such corresponding translated instruction. If there is no such match, but there is a match with a translated instruction in hot block storage area 304, the trace designator 314 transfers control to such corresponding translated instruction. In either case, such translated instruction is then executed, and control flow proceeds in accordance with such execution. In particular, if the current original instruction is part of a hot block and not a hot trace, control passes in accordance with the translated instructions of the hot block. Control passes out of the hot block either to hot trace selector 604 (if an exit has been reached) or back to the original instruction processor and emulator 310 (if such exit has not been reached) so that the original instruction processor and emulator 310 may fetch the next original instruction for processing (such next original instruction thus becoming the current original instruction).

Hot Block Identifier—The trace designator 314 includes a hot block identifier 600 and a hot block translator-instrumenter 602. The hot block identifier 600 determines if the frequency of execution of a target instruction has equaled or exceeded the threshold to start a hot block, and, if such threshold has been reached, designates the target instruction as the start of a hot block. The hot block identifier 600 also designates an instruction as the end of the hot block. Hot block translator-instrumenter 602 translates and instruments the hot block so that control flow through it may be monitored. The hot block translator-instrumenter 602 also stores the instrumented hot block into the hot block storage area 304.

Hot Block Translator-Instrumenter—As noted, the hot block translator-instrumenter 602 identifies the hot block of original instructions that starts with the frequently executed target instruction, assigns unique identifiers to the hot block and stores the unique identifiers in a hot block and hot trace look-up table 612, translates and instruments the hot block, stores the translated-instrumented hot block in memory, and transfers control to the translated-instrumented hot block for execution. In such manner, the hot block translator-instrumenter 602 creates complete translation and instrumentation instructions for the hot block. That is, translated instructions are created replicating every corresponding original instruction, and instrumentation instructions are created that execute the translated code using the original instructions as data thereby preserving the user flow of control.

Hot Trace Detection Instrumenter—It will be appreciated that the hot block identifier 600 may transfer processing to a hot trace detection instrumenter 608. The hot trace detection instrumenter 608 may identify that the hot block is a member of a hot trace and transfer this information back to the hot block identifier 600. The sequential flow of control followed in the original instruction storage area 302 will be directed by the flow of control of the trace. The hot block identifier will therefore process the information about the hot trace as part of its identification of the hot block.

Cold Block Identifier—In one embodiment of the present invention, if the hot trace selector 604 determines that there is insufficient space in hot block storage area 304 to store translated instructions, control passes to a cold block identifier 609. It will be understood that, in other embodiments, such passage of control may take place whether or not insufficient space is available. The cold block identifier 600 determines if any translated instructions may be removed from hot block storage area 304, as described below. Typically, translated instructions are identified for removal if the hot block from which the instructions were translated is no longer hot; i.e., the flow of control in executable code 112 has shifted so that the translated instructions are no longer frequently executed. Such formerly frequently, and currently infrequently, encountered translated instructions are referred to herein as cold blocks. In alternative embodiments, cold blocks may remain in hot block storage area 304. However, a disadvantage of such embodiments is that the amount of space required to store and retain all translated instructions may grow beyond the size initially allocated, requiring either an additional allocation of space or other action, including termination of the execution of executable code 112.

Returning to the illustrated embodiment, the cold block identifier 609 determines whether a formerly hot block in hot block storage area 304 has become cold, by determining whether control has passed through the block a sufficiently frequent number of times. Such determination may be made by any tracking technique known in the art such as employing a counter. When a block becomes cold, the target of such cold block may be identified by the cold block identifier 609 so that the translated instructions corresponding to such cold block may be removed by a cold block manager 610.

Cold Block Manager—In one embodiment of the present invention, the cold block manager 610 may change translation so that the space occupied by the coldest blocks, as described above, is indicated to be available. The cold block manager 610 then passes control to the hot block translator-instrumenter 602, so that translated instructions may be stored in the space made available by the removal of the coldest blocks. In so passing control, cold block manager 610 also passes information in a known manner to the hot block translator-instrumenter 602 to enable the backpatch manager 318 to backpatch jump or fall-through instructions having targets within the removed coldest blocks.

Optimizer—The optimizer 606 processes intermediate code when invoked by the hot trace selector 604. For example, the optimizer 606 can eliminate code which will never be reached during execution, can create register re-association, and can reverse the sense of conditional branches. Also, the optimizer 606 can create run-time shrink wrapping such as saving the machine states for instructions which surround the body of a procedure call. Saving the machine states will allow restoration of the machine states into a more advantageous location such as inside a block of code. By way of illustration, moving a code block associated with a procedure call out of the preamble of code eliminates overhead associated with saving and restoring the code. Upon completion of optimization processing the optimizer 606 returns processing control to the hot trace selector 604.

Backpatch Manager 318

Figure 7:
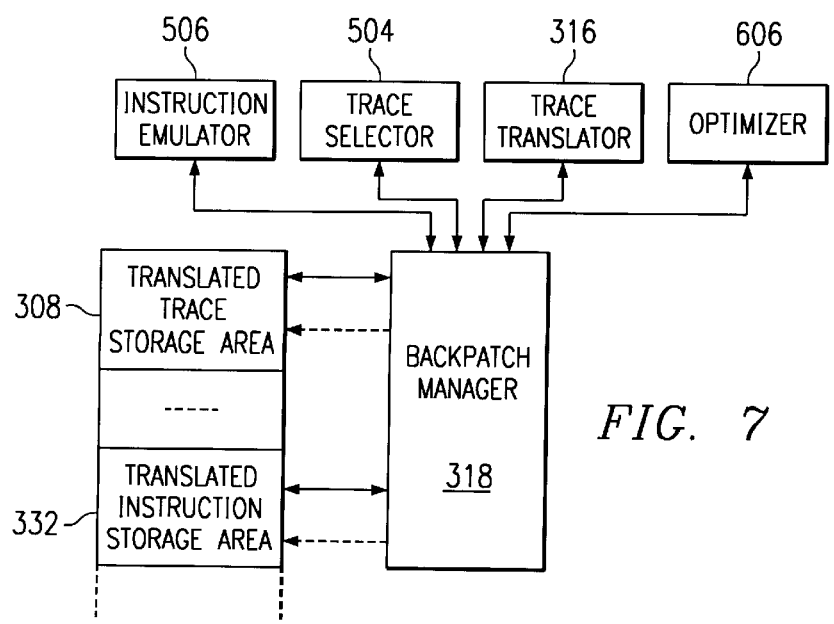
FIG. 7 is a flow diagram of the backpatch manager and its control flow.

As illustrated in detail in FIG. 7 and in one embodiment, the invention includes a backpatch manager 318 that manages the process of exiting from blocks of code. While two blocks of code may not be tied together during code generation, there may be an association between them due to a connecting branch instruction. By way of illustration, instead of exiting memory when one block of code, "A", encounters a branch to another block of code "B", the first time the branch from A to B is encountered, the branch is taken out and a backpatch is created. The backpatch causes sequential execution of "A" and "B" thereby eliminating the branching overhead. For instance, for a block "A", all exits from "A" will go to the backpatch manager 318 and the backpatch manager 318 will either:

(a) pass the target address to the instruction emulator 506, or (b) if code for the target is already in the memory 204 the backpatch manager 318 will backpatch, or (c) if the code has just reached the threshold as determined by the trace selector 504, the backpatch manager 318 will call the trace translator 316 and then continue as in case (b).

Therefore, blocks that are analyzed by the backpatch manager 318 are examined to determine if any other previously translated, or optimized block has a jump instruction that jumps to the newly translated block. That is, the new target instruction may initiate execution of a new code block that performs equivalent functions as the existing target instruction code block and that has been advantageously previously translated. If so, then the jump or fall-thorough instruction is backpatched; that is, it is changed so that control transfers directly to the newly translated block. Without backpatching, if the previously translated or optimized block were again to be executed, resolution of the jump or fall-through instruction would be repeated. It will be appreciated that without action from the backpatch manager the transfer of control may alternatively pass to the trace selector. Advantageously, by invoking the backpatch manager 318 control passes directly from the jump or fall-through instruction in the previously translated or optimized, and now re-executed, block to the newly translated block. An example of inefficient code is the use of unnecessary code transfers between instructions in computer memory and instructions located on slower storage media, such as transfers to different basic blocks.

For example and more particularly, in one embodiment of the present invention the backpatch manager 318 tests code in the translated instruction storage area 332 and in the translated trace storage area 308. Using any one of a variety of known search and compare techniques, backpatch manager 318 determines if any previously translated or optimized block has a jump or fall-through instruction that jumps to the block of original instructions from which translated instructions were translated. Such jump or fall-through instruction is then changed by the backpatch manager 318 so that its target instruction is no longer the target instruction in the block, which typically is the first instruction in the block, but, rather, is the corresponding target instruction in the translated instruction storage area 332. This backpatch process is repeated for every translated or optimized block that has a jump or fall-through instruction having a target instruction in the translated instruction storage area 332.

The backpatch manager 318 may also backpatch all blocks that have a jump or fall-through instruction having a target instruction in any cold block that was removed by the cold block manager 610 as described above. If so, then such jump instruction is backpatched; that is, it is changed so that control jumps to the original instruction storage area 302 and the backpatch manager 318 replaces a jump or fall-through instruction in a hot block to the corresponding original instruction in the original instruction storage area. Thus, the backpatch manager may work on cold traces in the reverse manner that it works on hot traces.

The backpatch manager 318 may examine blocks that are optimized by the optimizer 606. Such optimized blocks are examined to determine if any other previously translated, or optimized, block transfers control to the newly optimized block. If so, then the control transferring jump or fall-through instruction is backpatched so that control jumps directly to the newly optimized block. Thus, the translated block from which the optimized block was optimized may be eliminated from memory since all transfers to it have been backpatched to transfer to the optimized block.

Having now described one embodiment of the present invention, it should be apparent to those skilled in the relevant art that the foregoing is illustrative only and not limiting, having been presented by way of example only. Many other schemes for distributing functions among the various functional modules of the illustrated embodiment are possible in accordance with the present invention. The functions of any module may be carried out in various ways in alternative embodiments. More particularly, it will be understood by those skilled in the relevant art that control and data flows between and among functional modules of the invention and various data structures may vary in many ways from the control and data flows described above. More particularly, intermediary functional modules (not shown) may direct control or data flows; the functions of various modules may be combined, divided, or otherwise rearranged to allow parallel processing or for other reasons; intermediate data structures may be used; various described data structures may be combined; the sequencing of functions or portions of functions generally may be altered; and so on.

Although a specific embodiment of the invention has been described and illustrated, the invention is not to be limited to the specific forms or arrangement of parts so described and illustrated. The invention is limited only by the claims.

What is claimed is:

1. A computer implemented method for emulating and translating software executing a user process in memory; the user process comprising one or more blocks of instructions of executable code, and machine states; comprising, a. retrieving and storing the machine states;
   b. identifying sequences of the executable code that comprise the block of executable code;
   c. establishing an altered machine state to enable translation of the identified block of executable code to execute in the user process;
   d. translating the identified block of executable code if the identified block of executable code will execute at least a threshold number of times;
   e. analyzing the translated block of executable code to determine whether alterations can be made to enable faster execution of the translated executable code on the computer, and making the alterations for faster execution;
   f. executing the translated block of executable code;
   g. establishing an altered machine state to enable emulation of the identified block of executable code to execute in the user process; and
   h. emulating the identified block of executable code if the identified block of executable code will execute less than a threshold number of times.

2. A computer implemented method as set forth in claim 1, wherein when the identified block of executable code includes a particular system call instruction and if the particular system call instruction would execute outside of the user process, the particular system call instruction is, prior to execution, substituted with one or more instructions that will execute within the user process.

3. A computer implemented method as set forth in claim 1, further comprising, analyzing the emulated executable code to determine whether alterations can be made to enable faster execution on the computer and making the alterations for faster execution.

4. A computer implemented method for emulating and translating software executing a user process in memory; the user process comprising one or more blocks of instructions of executable code, one or more traces of the blocks of instructions, and machine states; comprising;

a. retrieving and storing machine states;
   b. identifying sequences of the instructions of executable code that comprise the block of instructions, and identifying the blocks of executable code that comprise the instruction trace;
   c. establishing an altered machine state to enable translation of the identified blocks of executable code to execute in the user process;
   d. translating the identified blocks of executable code if the identified instruction trace will execute at least a threshold number of times;
   e. analyzing the translated executable code to determine whether alterations can be made to enable faster execution of the translated executable code on the computer, and making the alterations for faster execution;
   f. executing the translated executable code;
   g. establishing an altered machine state to enable emulation of the identified blocks of executable code in the user process; and h. emulating the identified blocks of executable code if the identified instruction trace will execute less than a threshold number of times.

5. A computer implemented method for emulating and translating software executing a user process in memory as set forth in claim 4, further comprising, analyzing the emulated executable code to determine whether alterations can be made to enable faster execution of the emulated executable code on the computer and making the alterations for faster execution.

6. A computer implemented dynamic software development tool that executes a user process in memory, the user process that is established by an operating system in the computer; the user process comprising one or more instructions of executable code, one or more blocks of instructions, one or more traces of one or more blocks of instructions, and machine states; comprising, a. an original instruction processor that controls execution of the instruction;
   b. an execution interrupter that suspends the execution of the instruction in the computer operating system and continues the execution of the instruction under the control of the original instruction processor, and that returns control of the instruction back to the computer operating system when the original instruction processor has completed controlling the instruction execution;
   c. a machine state loader and preserver that loads and preserves the machine state during the execution of the instruction;
   d. a trace designator that designates the instructions that execute together into the block of instructions, and that designates the blocks of instructions that execute together into the trace; that determines if the trace is hot, and that tags the hot trace; and that establishes an altered the machine state that enables execution of the trace; and
   e. a trace translator that translates one or more traces that are tagged as hot;
   f. an instruction emulator that emulates the traces that are not tagged as hot;
   g. a trace selector that directs control of the instruction execution between the trace translator, the instruction emulator, and the translated trace;
   h. an augmenting tool that executes with the dynamic software development tool and the blocks of instructions; and
   i. a development tool manager that accesses the machine state from the machine state loader and preserver to determine whether to enable the augmenting tool.

7. A computer implemented dynamic software development tool that executes a user process in memory, as set forth in claim 6, wherein the trace designator determines whether the trace is hot by comparing the execution time of the total number of translated executions of the trace in the user process, to the execution time of the total number of emulated executions of the trace in the user process; and if the translation execution time is less than the emulated execution time tags the trace.

8. A computer implemented dynamic software development tool that executes a user process in memory, as set forth in claim 6, the trace designator further comprising, a. a hot block identifier that determines if the executing instruction is hot, determines if the executing hot instruction initiates the block or ends the block, and tags the block having the hot instruction that initiates the block or ends the block;
   b. a hot trace selector that determines if the executing block is tagged as hot, that determines if the hot block is a member of the trace, and that tags the trace having the hot block member;
   c. a hot block translator-instrumenter that determines if the executing block is tagged as hot, creates translated instructions for the hot block, and stores the translated hot block instructions in the memory; and
   d. a hot trace detection instrumenter that determines if the block is a member of the hot trace and transfers hot trace tag information to the hot block identifier.

9. A computer implemented dynamic software development tool that executes a user process in memory, as set forth in claim 6, the trace designator further comprising, a. a hot block identifier that determines if the executing instruction is hot, determines if the executing hot instruction initiates the block or ends the block, and tags the block having the hot instruction that initiates the block or ends the block;
   b. a hot trace selector that determines if the executing block is tagged as hot, that determines if the hot block is a member of the trace, and that tags the trace having the hot block member;
   c. a hot block translator-instrumenter that determines if the executing block is tagged as hot, creates translated instructions for the hot block, and stores the translated hot block instructions in the memory;
   d. a hot trace detection instrumenter that determines if the block is a member of the hot trace and transfers hot trace tag information to the hot block identifier;
   e. a cold block identifier that determines if there is sufficient space in the memory to continue to store the hot block, and if there is not sufficient space to continue to store the hot block changes the tag of the hot block; and
   f. a cold block manager that removes translated hot block instructions from the memory when the block is tagged as cold.

10. A computer implemented dynamic software development tool that executes a user process in memory, as set forth in claim 9, wherein the user process includes one or more blocks of target instructions; further comprising a backpatch manager that eliminates jumping to the target block of instructions if the target block of instructions has been tagged as cold and instead jumps to the trace selector.

11. A computer implemented dynamic software development tool that executes a user process in memory, as set forth in claim 6, the trace designator further comprising, an optimizer that arranges translated executable code for faster execution.

12. A computer implemented dynamic software development tool that executes a user process in memory, as set forth in claim 6, wherein the user process includes one or more blocks of target instructions; further comprising a backpatch manager that eliminates jumping to the trace selector if the block of target instructions has already been translated and is in the memory.

13. A computer implemented dynamic software development tool that executes a user process in memory, as set forth in claim 6, the memory having a profile data structure, wherein the augmenting tool comprises a profiling tool that stores the machine state during the execution of the translated block of instructions in the profile data structure.

14. A computer implemented dynamic software development tool that executes a user process in memory, as set forth in claim 13, that further enables the trace designator to make decisions about tagging traces by accessing the profile data structure.

15. A computer implemented dynamic software development tool that executes a user process in memory, as set forth in claim 6, wherein the augmenting tool comprises a simulation tool that invokes the development tool that in turn invokes the machine state loader and preserver to store the machine state during the execution of the translated block of instructions for simulation in the memory.

16. A computer implemented dynamic software development tool that executes a user process in memory, as set forth in claim 6, the memory having an analysis data structure, wherein the augmenting tool comprises an analyzer tool that stores the machine state during the execution of the translated block of instructions, for analysis, in the analysis data structure.

17. A computer implemented dynamic software development tool that executes a user process in memory, as set forth in claim 6, the memory having a debug data structure, wherein the augmenting tool comprises a debug tool that stores the machine state during the execution of the translated block of instructions, for debugging, in the debug data structure.

18. A computer implemented dynamic software development tool that executes a user process in memory, as set forth in claim 6, the memory having a monitor data structure, wherein the augmenting tool comprises a monitor tool that stores the machine state during the execution of the translated block of instructions, for monitoring, in the monitor data structure.

19. A computer implemented dynamic software development tool that executes a user process in memory, the user process that is established by an operating system in the computer; the user process comprising one or more instructions of executable code arranged in a programmed order, one or more blocks of instructions, and one or more traces of one or more blocks of instructions; comprising,
   a. a hot block identifier that determines if the executing instruction is hot, determines if the executing hot instruction initiates the block or ends the block in the programmed order, and tags the block having the hot instruction that initiates the block or ends the block;
   b. a hot trace selector that determines if the executing block is tagged as hot, that determines if the hot block is a member of the trace, and that tags the trace having the hot block member;
   c. a hot block translator-instrumenter that determines if the executing block is tagged as hot, creates translated instructions for the hot block, and stores the translated hot block instructions in the memory; and
   d. a hot trace detection instrumenter that determines if the block is a member of the hot trace and transfers hot trace tag information to the hot block identifier.

20. A computer implemented dynamic software development tool that executes a user process in memory, the user process that is established by an operating system in the computer; the user process comprising one or more instructions of executable code arranged in a programmed order, one or more blocks of instructions, and one or more traces of one or more blocks of instructions; comprising,
   a. a hot block identifier that determines if the executing instruction is hot, determines if the executing hot instruction initiates the block or ends the block in the programmed order, and tags the block having the hot instruction that initiates the block or ends the block;
   b. a hot trace selector that determines if the executing block is tagged as hot, that determines if the hot block is a member of the trace, and that tags the trace having the hot block member;
   c. a hot block translator-instrumenter that determines if the executing block is tagged as hot, creates translated instructions for the hot block, and stores the translated hot block instructions in the memory;
   d. a hot trace detection instrumenter that determines if the block is a member of the hot trace and transfers hot trace tag information to the hot block identifier;
   e. a cold block identifier that determines if there is sufficient space in the memory to continue to store the hot block, and if there is not sufficient space to continue to store the hot block changes the tag of the hot block; and
   f. a cold block manager that removes the translated hot block instructions from the memory when the block is tagged as cold.

21. A computer implemented dynamic software development tool that executes a user process in memory, the user process that is established by an operating system in the computer; the user process comprising one or more instructions of executable code arranged in a programmed order, one or more blocks of instructions, and one or more traces of one or more blocks of instructions; comprising,
   a. a hot block identifier that determines if the executing instruction is hot, determines if the executing hot instruction initiates the block or ends the block in the programmed order, and tags the block having the hot instruction that initiates the block or ends the block;
   b. a hot trace selector that determines if the executing block is tagged as hot, that determines if the hot block is a member of the trace, and that tags the trace having the hot block member;
   c. a hot block translator-instrumenter that determines if the executing block is tagged as hot, creates translated instructions for the hot block, and stores the translated hot block instructions in the memory;
   d. a hot trace detection instrumenter that determines if the block is a member of the hot trace and transfers hot trace tag information to the hot block identifier; and
   e. an optimizer that alters the translated hot block instructions for faster execution.

22. A computer implemented dynamic software development tool that executes a user process in memory, the user process that is established by an operating system in the computer; the user process comprising one or more instructions of executable code arranged in a programmed order, one or more blocks of instructions, and one or more traces of one or more blocks of instructions; comprising,
   a. a hot block identifier that determines if the executing instruction is hot, determines if the executing hot instruction initiates the block or ends the block in the programmed order, and tags the block having the hot instruction that initiates the block or ends the block;
   b. a hot trace selector that determines if the executing block is tagged as hot, that determines if the hot block is a member of the trace, and that tags the trace having the hot block member;
   c. a hot block translator-instrumenter that determines if the executing block is tagged as hot, creates translated instructions for the hot block, and stores the translated hot block instructions in the memory;
   d. a hot trace detection instrumenter that determines if the block is a member of the hot trace and transfers hot trace tag information to the hot block identifier;
   e. a cold block identifier that determines if there is sufficient space in the memory to continue to store the hot block, and if there is not sufficient space to continue to store the hot block changes the tag of the hot block;

f. a cold block manager that removes translated hot block instructions from the memory when the block is tagged as cold; and g. an optimizer that alters the translated hot block instructions for faster execution.

23. An article of manufacture comprising a computer product for emulating and translating an executing user process loaded in memory; the user process including one or more blocks of software instructions of executable code, and maintaining machine states; comprising a program storage medium wherein;

a. computer readable program code retrieves and stores the machine states;

b. computer readable program code identifies the software instructions of executable that comprise the block;

c. computer readable program code establishes an altered machine state to enable translation of the identified block of executable code to execute in the user process;

d. computer readable program code translates the identified block of executable code if the identified block of executable code will execute at least a threshold number of times;

e. computer readable program code analyzes the translated executable code to determine whether alterations can be made to enable faster execution of the translated executable code on the computer, and makes the alterations for faster execution;

f. computer readable program code executes the translated executable code;

g. computer readable program code establishes an altered machine state to enable emulation of the identified block of executable code in the user process; and h. computer readable program code emulates the executable code if the identified block of executable code will execute less than a threshold number of times.

24. A computer program product for use with an appropriate computing system, for emulating and translating software executing a user process in memory; the user process comprising one or more blocks of instructions of executable code, and machine states; comprising, a. retrieving and storing the machine states;

b. identifying sequences of the instructions of executable code that comprise the block of executable code;

c. establishing an altered machine state to enable translation of the identified block of executable code to execute in the user process;

d. translating the identified block of executable code if the identified block of executable code will execute at least a threshold number of times;

e. analyzing the translated executable code to determine whether alterations can be made to enable faster execution of the translated executable code on the computer, and making the alterations for faster execution;

f. executing the translated executable code;

g. establishing an altered machine state to enable emulation of the identified block of executable code in the user process; and h. emulating the identified block of executable code if the identified block of executable code will execute less than a threshold number of times.

25. A computer program product for use with an appropriate computing system, for emulating and translating software executing a user process in memory; the user process comprising one or more blocks of instructions of executable code, one or more instruction traces of the blocks of instructions, comprising;

a. retrieving and storing machine states;

b. identifying sequences of the instructions of executable code that comprise the block of instructions, and identifying the blocks of executable code that comprise the instruction trace;

c. establishing an altered machine state to enable translation of the identified blocks of executable code to execute in the user process;

d. translating the identified blocks of executable code if the identified instruction trace will execute at least a threshold number of times;

e. analyzing the translated executable code to determine whether alterations can be made to enable faster execution of the translated executable code on the computer, and making the alterations for faster execution;

f. executing the translated executable code;

g. establishing an altered machine state to enable emulation of the identified blocks of executable code in the user process; and h. emulating the executable code if the identified instruction trace will execute less than a threshold number of times.

* * * * *